INVENTORS
ROBERT J. JAUCH,
BY CHRISTIAN W. KRUCKEBERG and
CHARLES D. HOOVER,

ATTORNEYS.

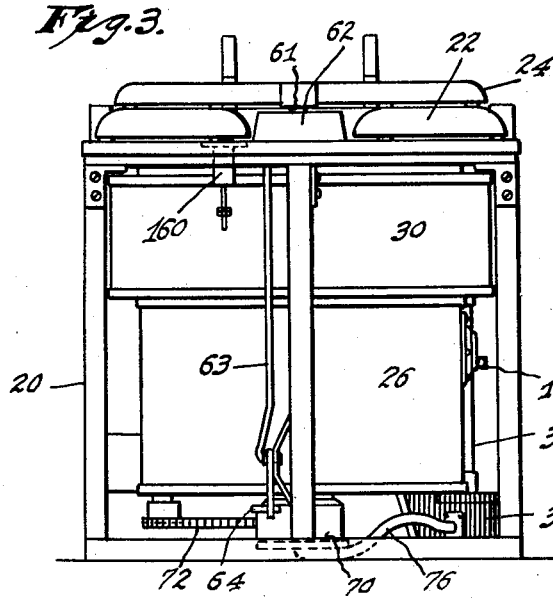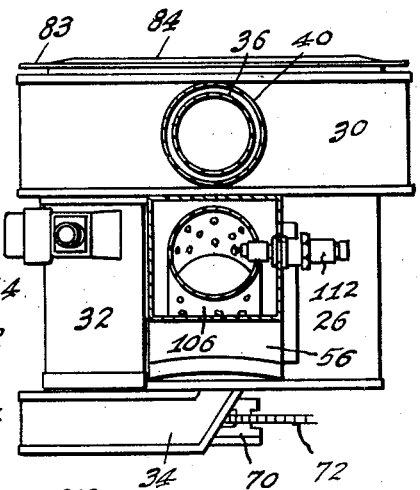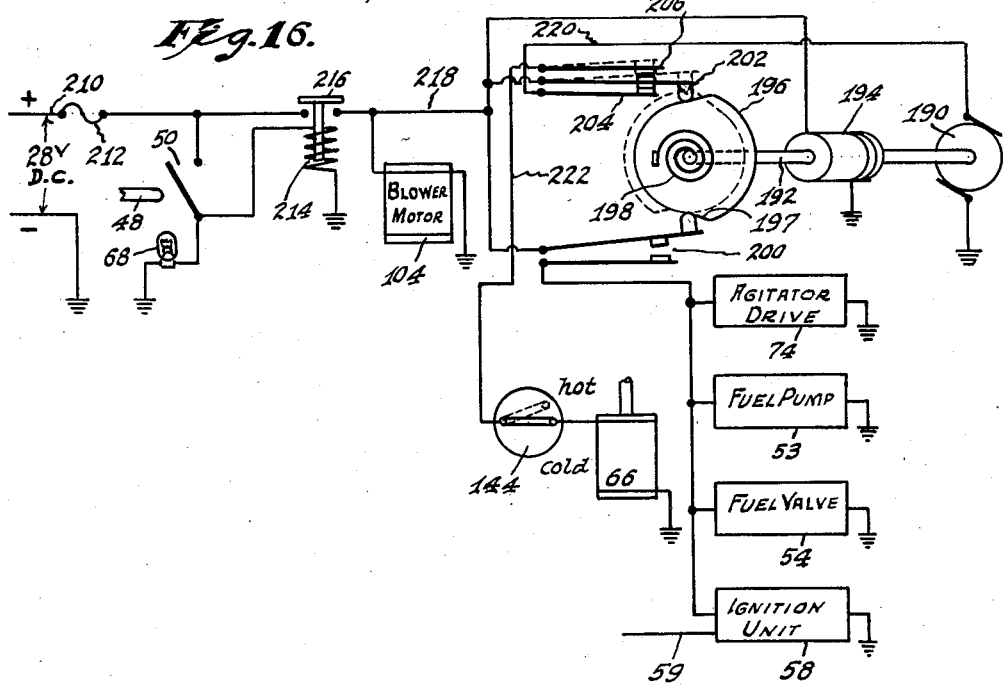

April 21, 1959
R. J. JAUCH ET AL
2,882,534
INCINERATOR TOILET
Filed Dec. 7, 1954
5 Sheets-Sheet 3
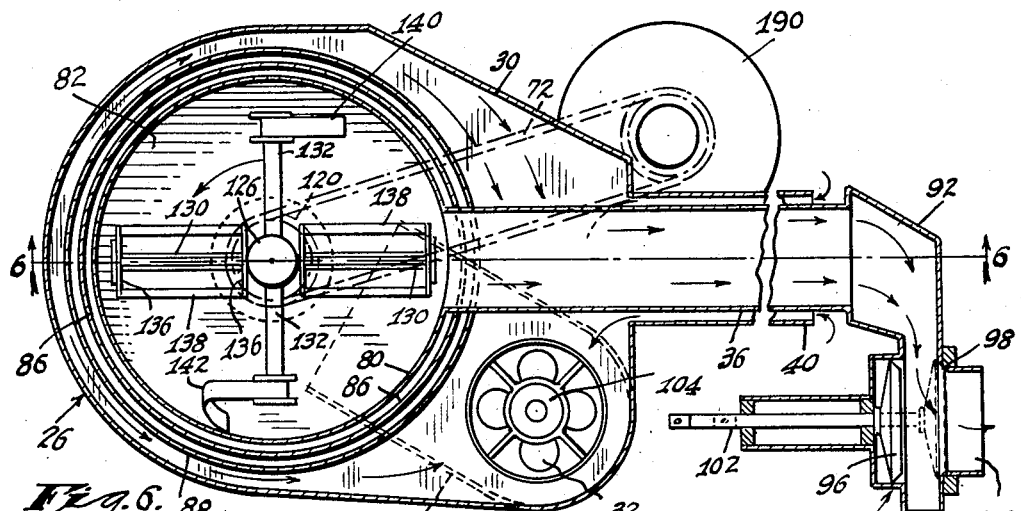
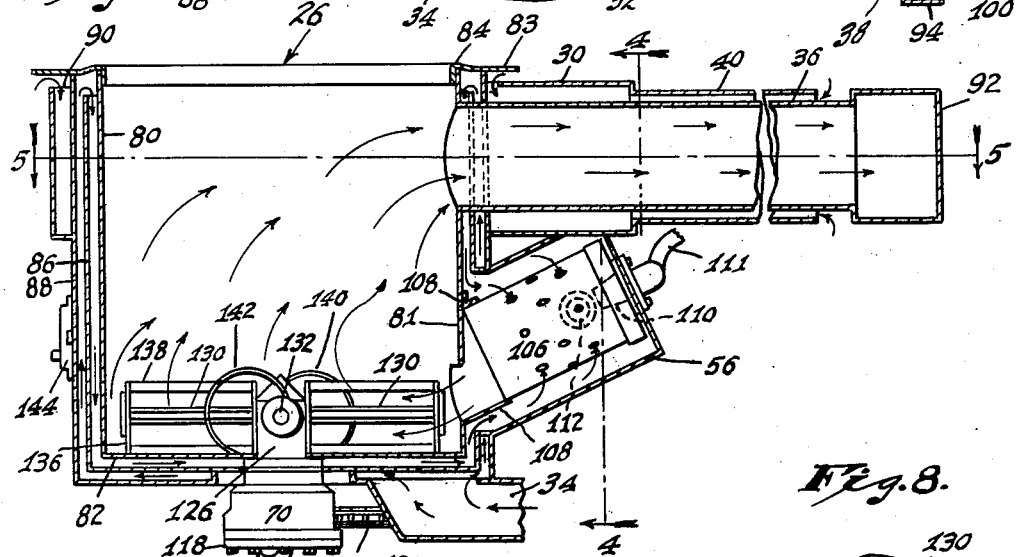
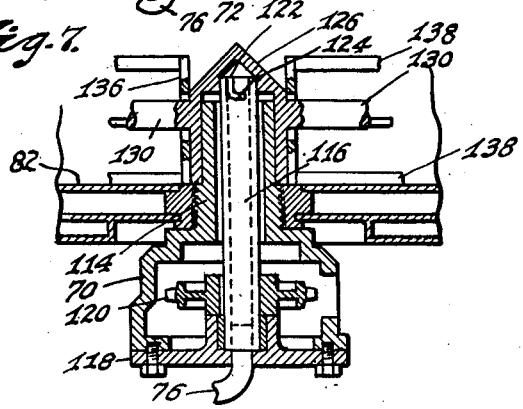
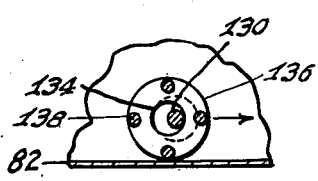
INVENTORS
ROBERT J. JAUCH,
CHRISTIAN W. KRUCKEBERG and
CHARLES D. HOOVER,
BY
ATTORNEYS.

April 21, 1959  R. J. JAUCH ET AL  2,882,534
INCINERATOR TOILET
Filed Dec. 7, 1954  5 Sheets-Sheet 4
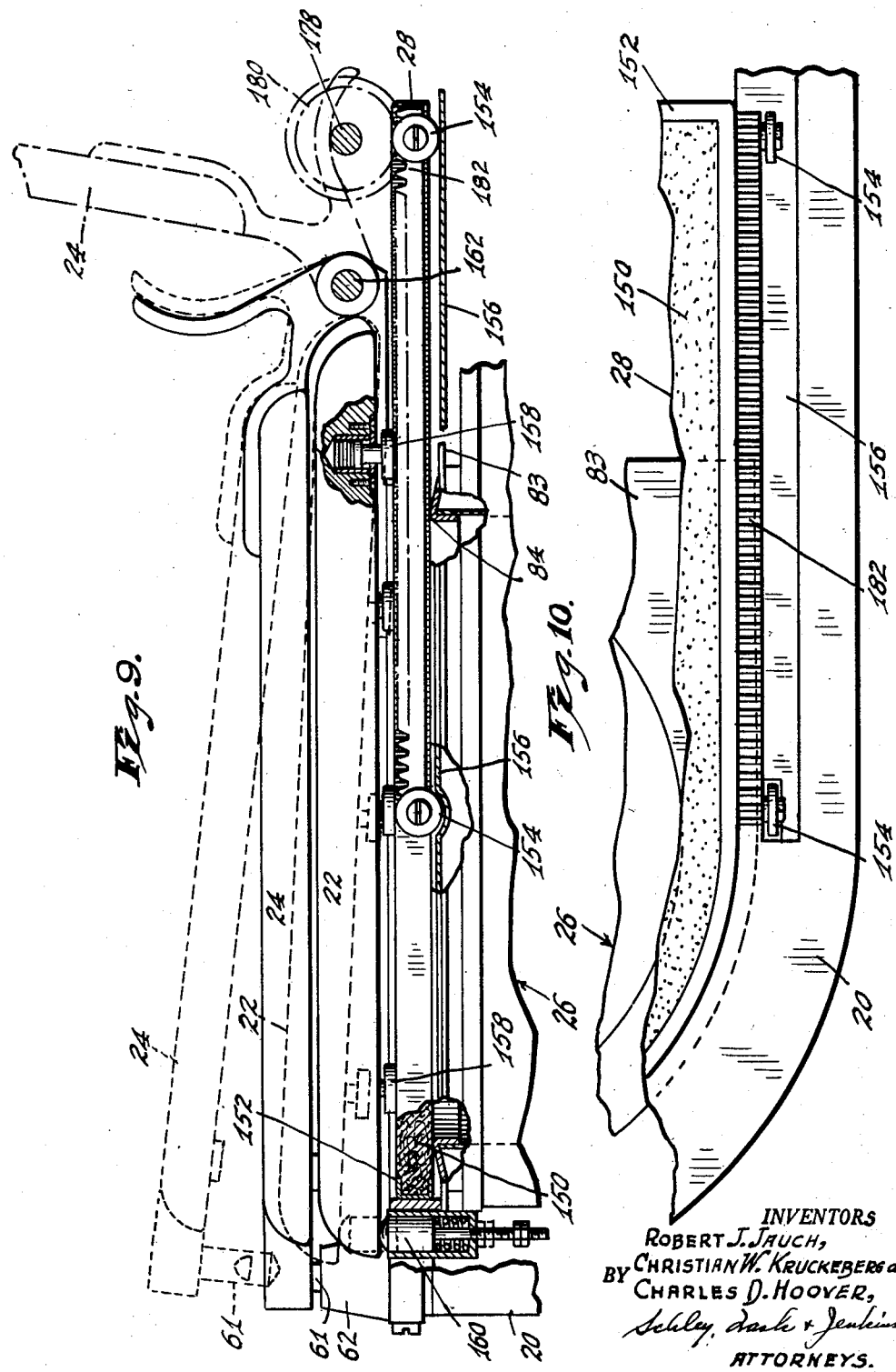
INVENTORS
ROBERT J. JAUCH,
BY CHRISTIAN W. KRUCKEBERG and
CHARLES D. HOOVER,
ATTORNEYS.

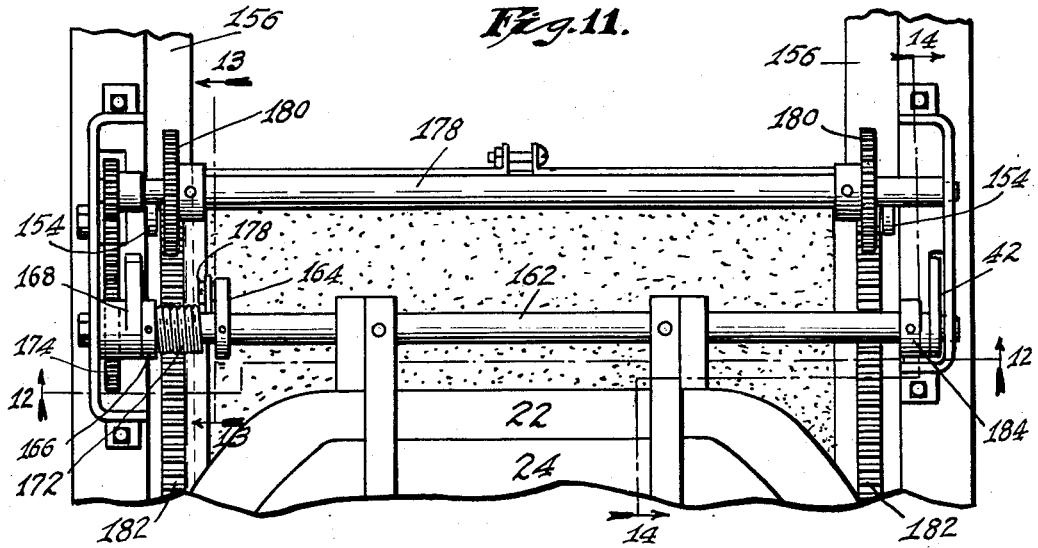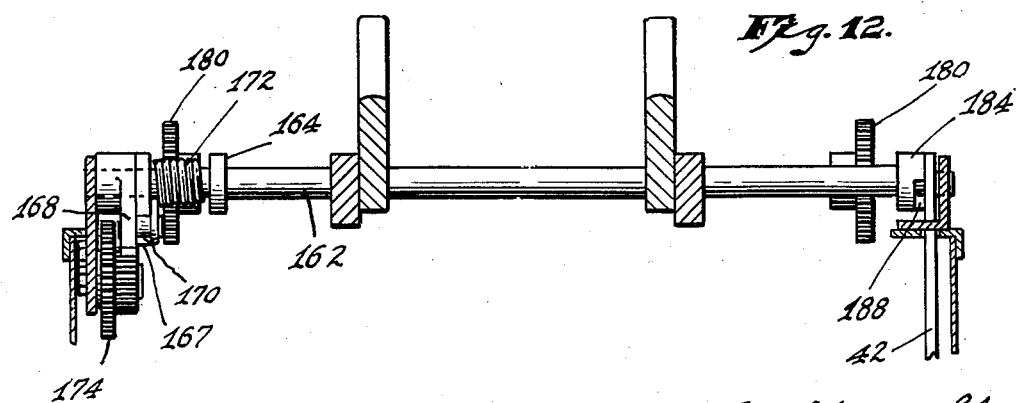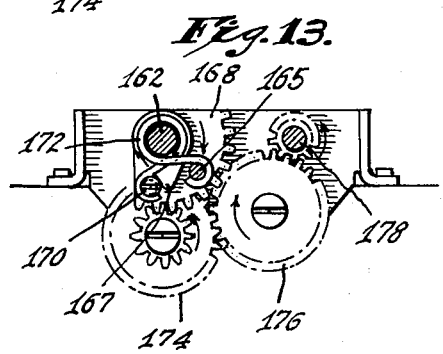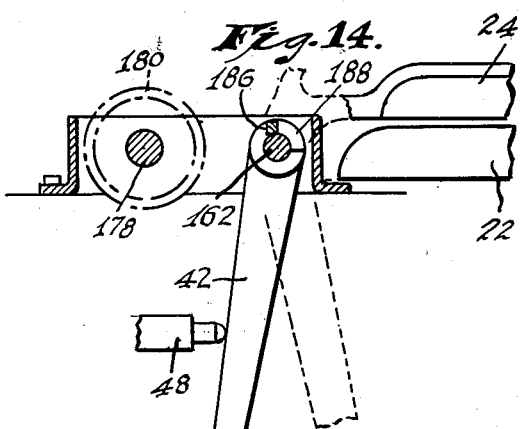

United States Patent Office 2,882,534
Patented Apr. 21, 1959

2,882,534
INCINERATOR TOILET

Robert J. Jauch and Christian W. Kruckeberg, Fort Wayne, Ind., and Charles D. Hoover, Upperco, Md., assignors to Tokheim Corporation, Fort Wayne, Ind., a corporation of Indiana Application December 7, 1954, Serial No. 473,534

9 Claims. (Cl. 4—131)

This invention relates to an incinerator toilet.

It is an object of the invention to provide a toilet adapted for use where connection to a usual sewage system is impractical, as in moving vehicles such as trains, busses, and airplanes, in house trailers, in locations such as in isolated areas where it is inconvenient or impractical to install usual sewage systems, etc. It is an object of the invention to provide a toilet in combination with disposal apparatus adapted to dispose completely of the sewage or toilet wastes, and to do so safely, efficiently, and rapidly. It is an object of the invention to provide such apparatus which incinerates toilet wastes and reduces them to sterile and harmless gases and fly ash which may be discharged to the atmosphere, which completes its disposal cycle in a short time to make the toilet available for subsequent use with a minimum delay, which locks the toilet against use during such cycle, which is fool-proof and operates automatically following an initiating manual operation, and which is self-cleaning and esthetically unobjectionable in use and operation. It is an object of the invention to provide toilet and disposal apparatus which uses no flushing liquids or other additives, which immediately disposes of the wastes without storage, and which requires no emptying service. It is an object of the invention to provide apparatus in which the incineration is produced by the high-temperature flame of combustion of a fluid fuel, such as gasoline or oil or gaseous fuel, in which fuel consumption is low, and in which the operation presents no fire hazard and no danger to the user of the toilet. It is an object of the invention to provide such a toilet apparatus which is of compact size and low weight and requires a minimum of service connections, so that it is readily portable and adapted to a wide variety of installations. It is an object of the invention to provide a toilet which has these advantages and which is economical and practical to manufacture and is reliable in use.

In accordance with the invention, toilet wastes are received in a receptacle and quickly dried and incinerated by direct exposure to flame, that is, with the flame in direct-fired relationship to the wastes, and desirably with a high-velocity flame forcibly directed against the wastes, and preferably while they are agitated and broken up by a mechanical agitator, and desirably by an agitator which carries adhering wastes through the flame blast.

A toilet seat of the usual type, and preferably a toilet seat lid, may be mounted above the incineration receptacle. The receptacle desirably has a sealing cover which is open during toilet use and is closed during the disposal cycle, and has a stack outlet. The stack outlet may contain a normally closed valve which is opened during the disposal cycle.

The disposal cycle includes an incineration step, which is suitably controlled, as by a timer, to complete the disposal of the wastes. The cycle desirably also includes a cooling operation, and may be terminated when the temperature of the heated parts of the apparatus are cooled to a predetermined point.

Air for combustion and cooling is preferably drawn into the apparatus, as by a blower, at an opening or series of openings in close proximity to the joint between the receptacle and its cover, where the in-flowing air will carry with it any fumes which might escape from the receptacle during the cycle. The air is moved between spaced walls around the receptacle, to cool it and to be preheated, and is then delivered to a fuel-mixing chamber which discharges into the receptacle.

The fuel, such as gasoline, fuel oil, gas, or the like, is drawn from a tank mounted with the apparatus or from some external source, and is injected into the mixing chamber during the incineration step. The fuel mixture is ignited by a suitable ignition element, such as a glow plug or a spark plug, and produces a forceful flame which is discharged at high velocity into the receptacle and downward toward the bottom of the receptacle. The flame blast is discharged directly onto the wastes which rest on the bottom of the receptacle and directly into the path of the agitator, and travels across the bottom wall and across the path of the agitator. The flame stream carries an excess of air over that required for fuel consumption, and thus provides a blast of air to support and promote rapid combustion of the waste material.

The agitator, which desirably includes a loosely mounted open roller and may also include one or more scraping elements, is slowly rotated over the bottom of the receptacle, to break up the solids and to prevent the formation of difficultly burnable encrusted lumps or particles. The agitator desirably passes through the flame during at least part of its movement, and desirably has parts which move into and out of the wastes to carry wastes into the flame on its surfaces.

The agitation and direct-firing flame rapidly convert the sewage to vapors and fly ash, and the products of combustion and of this conversion are discharged through the stack to the atmosphere. The hot flame also scours and cleans the interior of the receptacle and the surfaces of the agitator.

At the end of the combustion step the agitator and the fuel supply and the ignition are turned off, but the blower is allowed to continue, preferably under temperature control, until the receptacle has cooled to a predetermined temperature, and the disposal cycle is then terminated.

The toilet is desirably protected against use and the receptacle cover held closed until the cycle is completed and the receptacle cooled to a useable temperature. Conveniently, this protection is obtained by locking the toilet lid or the receptacle cover in closed position. The disposal cycle is preferably initiated by a manual operation corresponding to the usual flushing operation, and where the lid is locked in closed position, the initiating manual operation is conveniently the operation of closing the lid. The lock mechanism remains locked throughout the disposal cycle, and is released at the end of that cycle to indicate that the toilet is again available for use.

The accompanying drawings illustrate the invention. In such drawings:

Fig. 3 is a front elevation of the toilet;

Fig. 4 is a transverse section of the receptacle assembly, taken substantially on the line 4—4 of Fig. 6;

Fig. 5 is a horizontal section of the receptacle assembly, taken on the line 5—5 of Fig. 6;

Fig. 6 is a vertical longitudinal section taken on the line 6—6 of Fig. 5;

Fig. 7 is a vertical section on an enlarged scale, showing the agitator drive;

Fig. 8 is a sectional view of one of the open rollers of the agitator;

Fig. 9 is a side elevation, partly in section, showing the toilet seat and lid and the receptacle cover;

Fig. 10 is a fragmental plan view of the receptacle cover and its supporting mechanism;

Fig. 11 is a fragmental plan view showing the operating mechanism actuated by the lid;

Fig. 12 is a partial vertical section taken on the line 12—12 of Fig. 11;

Fig. 13 is a section taken on the line 13—13 of Fig. 11;

Fig. 14 is a section taken on the line 14—14 of Fig. 11;

Fig. 16 is an electrical diagram.

Figure 1:
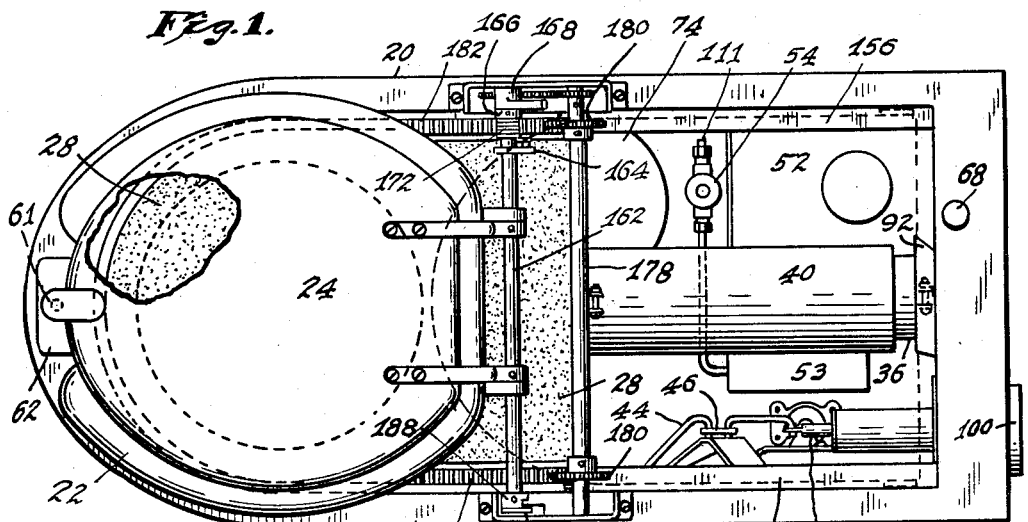
Fig. 1 is a top plan view of an incinerator toilet embodying the invention.
Figure 2:
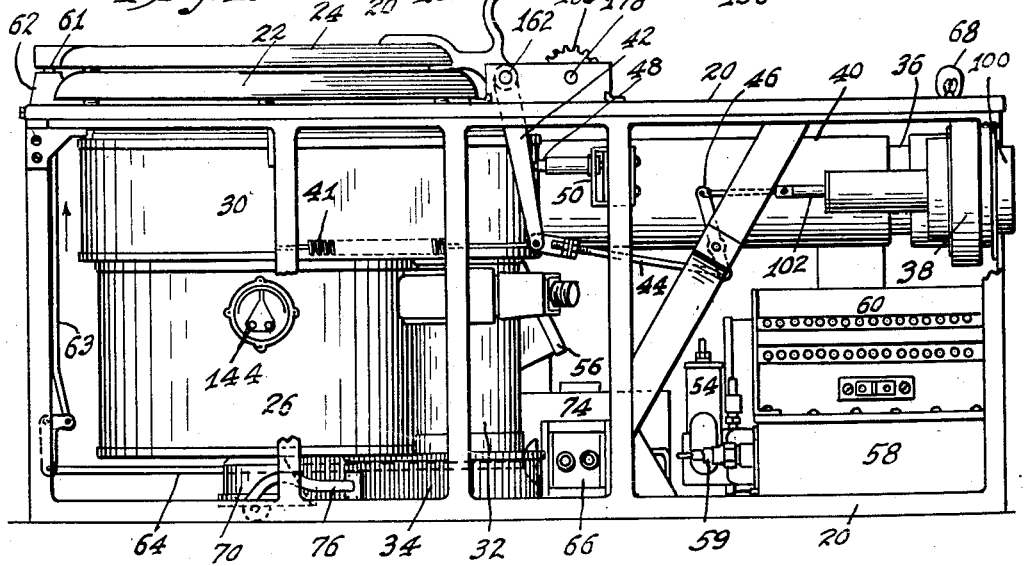
Fig. 2 is a side elevation of the toilet of Fig. 1, with its outer enclosure omitted.

The incinerator toilet shown in the drawings comprises an outer frame 20 which normally carries an inclosure wall as of open mesh material. A toilet seat 22 and lid 24 are pivotally supported on top of the frame 20, immediately above a receptacle assembly 26. A receptacle cover 28 is slidably mounted at the top of the frame 20, and is operatively connected to the lid 24, to be moved from its closed position shown in full lines in Fig. 1 to its open position shown in dotted lines in Fig. 1 upon lifting movement of the lid 24. In Figs. 1 and 2, the parts are shown in the position which they assume during the disposal cycle, with the lid 24 fully closed and locked in closed position. When the lid 24 is in released position it stands at a slight angle above the position shown in Figs. 1 and 2.

The receptacle assembly 26 includes an air inlet collar 30 which has an air intake opening at the top of the receptacle and which supplies air to a blower 32. The blower discharges to a transfer duct 34 leading to air passages between the spaced walls of the receptacle. Products of combustion are discharged from the receptacle through a stack 36 which leads to an outlet valve housing 38 and which is desirably enclosed over most of its length by a sleeve 40 forming a continuation of the air inlet collar 30. The lid 24 is connected through a lost motion connection with an actuating lever 42; and such lever 42 is biased to inoperative position by a spring 41, is connected to the outlet valve 38 by a link 44 and lever 46, and is arranged to actuate a plunger 48 to close a master switch 50.

The frame 20 also encloses a fuel tank 52 from which fuel is supplied by a fuel pump 53 through a normally closed solenoid valve 54 to the fuel injection nozzle of the burner 56 which forms part of the receptacle assembly. Ignition is supplied from an ignition unit 58, and electrical connections are conveniently made at a panel 60 which may support the timer.

The lid 24 carries a latch member 61 at its free edge, which in closed position enters a lock 62, which is actuated to released position by links 63 and 64 from a solenoid 66.

A pilot light 68 may be mounted at the rear of the frame to indicate that the toilet is operative in its disposal cycle and is not available for use.

The bottom of the receptacle assembly 26 carries an agitator-drive housing 70, connected by a chain 72 to an agitator-drive motor 74. The agitator-drive shaft may be supplied with cooling air through a pipe 76 leading from the transfer duct 34.

As shown in Figs. 5 and 6, the receptacle assembly comprises an incinerator chamber wall 80 closed at the bottom by a bottom wall 82 and connected at its top to a flange 83 which forms a rim seat 84 against which the cover 28 is seated when closed. An intermediate wall 86 stands in spaced relation to the chamber wall 80, and terminates shortly below the flange 83. The intermediate wall is surrounded by an outer wall 88 which is joined at the top to the flange 83 and which is connected at the bottom to the walls of the transfer duct 34. The air-collecting collar 30 is joined at the bottom to the outer wall 88, but its upper inner edge is spaced from that wall to provide an air inlet opening 90 around the upper end of the receptacle immediately below the flange 83. The sleeve 40 surrounding the stack pipe 36 is open at its outer end to provide a second air inlet opening, and is connected at its inner end to the wall of the collar 30.

The stack 36 is connected to a transfer conduit 92 which leads to a stack outlet valve housing 38. The stack valve 96 is a poppet-type valve which seats against a seat 98 about an outlet collar 100, and is provided with an operating stem 102.

As is shown in Fig. 5, the air inlet collar 30 is extended to the rear and its bottom wall is connected to the housing of the blower 32. The blower 32 is an axial-flow blower driven by a coaxial motor 104, and operates to move air downwardly from the collar 30 to the transfer duct 34.

At the rear of the receptacle assembly, the space between the inner wall 80 and the intermediate wall 86 communicates with the burner assembly 56. This comprises an outer shell and an inner cylindrical mixing tube 106. The tube is perforated to admit air to the mixing chamber which it defines, and its inner end is received within a collar 108 carried by the combustion chamber wall 80. The tube 106 is supported at its outer end by the outer wall of the shell 56, and a fuel nozzle 110 is positioned centrally in its outer end. An ignition element, here shown as a spark plug 112, extends through the burner shell 56 into the side of the mixing tube 106. The burner assembly is inclined inward and downward, and the upper half of its outlet end is restricted by a portion 81 of the incinerator chamber wall 80. The inclination of the mixing tube 106 and the deflecting action of the wall portion 81 causes the flame emitted from the mixing tube 106 to be discharged downward at high velocity toward the bottom of the incineration chamber.

During the disposal cycle, air enters the receptacle assembly 26 through the openings 90 beneath the seat flange 84 and through the open end of the stack sleeve 40. The entering air is received in the collar 30 and passes therefrom through the blower 32 downward to the transfer passage 34. This discharges to the space between the two outer walls 86 and 88 of the receptacle, where the air flows upwardly to the top of the receptacle and enters the space between the inner pair of walls 80 and 86. In this space it flows downward and circumferentially to the burner shell 56, where it is discharged through the perforations of the mixing tube 106 to mix with the fuel injected by the nozzle 110.

The agitator drive housing 70 is carried by the bottom walls of the receptacle assembly, and its upper end forms a sleeve 114 standing above the bottom wall 82 of the incinerator chamber. Such sleeve 114 forms an upper bearing for a hollow drive shaft 116 whose lower end is journaled in the bottom cover plate 118 of the housing and which carries a sprocket 120. The upper end of the hollow shaft 116 carries a bayonet slot 122 to receive a supporting and driving cross pin 124 for the agitator assembly. The agitator assembly comprises an inverted cupped-shaped hub 126 which loosely fits over the collar 114 and which carries the cross pin 124 by which it is supported on the shaft 116. The air pipe 76 is connected to the bottom plate 118 of the housing 70 to discharge air upwardly through the hollow shaft 116. The air escapes from the upper end of the shaft inside the hub 126 and escapes through the bearing clearance of the shaft 116 and through the clearance space between the collar 114 and the hub 126. It thus cools these parts and opposes the escape of sewage through the clearance spaces.

The agitator hub 126 carries at least one roller drive rod 130, and as shown carries two such rods 130 and two scraper drive rods 132, all such rods extending radially from the hub. Each roller rod 130 is loosely received in the central bearing openings 134 of an open roller 136. The roller is formed of two circular end plates interconnected by a plurality of axially extended rods 138 welded to the end plates at their peripheries. As shown in Fig. 8, the bearing openings 134 in the end plates of the rollers are quite large in comparison with the size of the drive rods 130. The drive rods 130 drive the loosely mounted rollers around in rolling engagement on the bottom wall 82 of the receptacle, and they ride freely on that bottom wall or on the wastes which may be lying on that wall.

The two scraper rods 132 respectively carry C-shaped scrapers 140 and 142. The scraper 142 is bent outward so that its lower end engages the bottom wall 82 at the corner between that bottom wall and the inner side wall 80. The scraper 140 engages the bottom wall 82 along a path spaced inwardly from the path of the scraper 142. The gaitator is driven at a relatively low speed, say 50 r.p.m., by the chain 72 from the motor 74.

The predetermined cut-off temperature, to which the receptacle assembly is cooled before the disposal cycle is terminated, may be sensed from the incinerator chamber itself or from the inner receptacle wall 80. Preferably, however, the cut-off temperature is sensed by a thermal switch 144 carried on the outer wall 88 of the receptacle assembly in position to be heated by radiation, and such switch is desirably positioned at a point opposite the burner 56 where the wall 80 is directly impinged by the burning gases as they travel from the burner 56 to the stack 36.

The burner nozzle 110 is connected to the fuel valve 54 by a suitable supply pipe 111. The ignitor 112 is connected to the ignition unit 58 by a high-tension line 59. Other electrical connections are made in a manner which will be described in connection with the electrical diagram of Fig. 16.

Figs. 9 and 10 show the operation of the cover for the receptacle. The cover member 28 comprises a fireproof wall such as an asbestos slab 150 carried at its edges in a channel frame 152. The opposite sides of the frame each carry a pair of rollers 154 which ride on a track 156 on the main frame 20, and which support the cover 28 for longitudinal movement between a forward receptacle-closing position shown in Figs. 9 and 10 and a rearward open position where it uncovers the receptacle. At the position of the front rollers 154 when the cover 28 is in its forward position, the track 156 is depressed to allow the cover to drop against the rim 84 formed by the flange at the top of the receptacle. To press it against that rim, the toilet seat 22 carries a series of spring-pressed feet 158 which press downward against the cover 28 when the toilet seat is lowered by the locking movement of the seat lid 24. An upwardly pressed plunger 160 at the front of the toilet seat 22 lifts that seat to carry its feet 158 out of engagement with the cover 28 during movements of that cover.

The opening and closing movements of the cover 28 are driven by manipulation of the toilet lid 24, through the mechanism shown in Figs. 11 to 13. The lid 24 is fixed on a pivot shaft 162 which carries in fixed relation a spring-reaction collar 164 and a drive collar 166. A gear sector 168 is loosely mounted on the shaft 162, and carries a drive pin 170 in position to be driven by a lug 167 on the drive collar 166. A coil spring 172 has its ends engaged respectively with the drive pin 170 and with a spring-reaction pin 165 on the collar 164.

When the lid 24 is in unlocked but closed position, it stands at a slight angle above horizontal, as shown in dotted lines in Fig. 9, being supported in this position by the spring 172. When the lid is in this position, its interconnected shaft 162, spring-reaction collar 164, and cam collar 166 stand in the positions shown in Fig. 13. The gear sector 168 is at the limit of its counterclockwise movement so that its drive pin 170 cannot move counterclockwise from the position shown in Fig. 13. However, the spring reaction pin 165 and the drive lug 167 (which have a fixed relation to each other) can move counterclockwise in opposition to the force of the spring 172, and the spring allows such movement to permit the lid 24 to be depressed from its unlocked closed position shown in dotted lines in Fig. 9 to its locked closed position shown in full lines in Fig. 9.

Upon lifting movement of the lid 24 from its unlocked closed position, the shaft 162 and its fixed drive lug 167 are rotated clockwise in Fig. 13 to drive the sector pin 170 and the sector gear 168 in a clockwise direction. The movement of the sector gear 168 drives the gear train 174—176 to rotate a cover drive shaft 178. Such drive shaft carries a pair of cover drive gears 180 in engagement with a pair of racks 182 fixed to the sides of the cover frame 152. The gear train 174—176 is such that movement of the lid 24 from its unlocked closed position shown in dotted lines in Fig. 9 to its full open chain-line position shown in chain lines in Fig. 9 actuates the cover 28 from its fully closed position to its fully retracted position.

Closing movement of the lid 24 to its locked position initiates the incineration cycle. To this end, the right-hand end (Figs. 11 and 12) of the lid pivot shaft 162 carries a fixed actuating collar 184, on which is mounted a drive pin 186 for the actuating lever 42. The lever 42 is loosely mounted on a shaft 162 and is provided with a lug 188 in the path of the drive pin 186. As the lid 24 moves to fully closed and locked position, the drive pin 186 engages the lug 188 of the actuating lever and moves that lever to its actuating position as shown (from the outside) in Fig. 2 and (from the inside) in Fig. 14. Upon release movement of the lid 24 from its locked closed position to its unlocked closed position, the drive pin 186 moves counterclockwise in Fig. 14. to release the actuating lever 42 to its released position shown in dotted lines in Fig. 14. Further lifting movement of the seat 24, as to its chain-line position in Fig. 9, is permitted by lost motion between the drive pin 186 and the lug 188 on the actuating lever, and causes no further movement of that lever.

Figure 15:
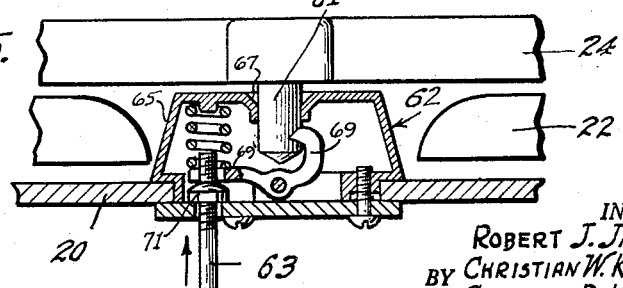
Fig. 15 is a vertical section showing the locking mechanism for the toilet seat and lid.

The lock 62 used to lock the lid 24 in fully closed position is arranged to lock automatically as the lid is moved to closed position, and to be released by lifting movement of the link 63. As shown in Fig. 15, the lock housing 65 is carried by the main frame 20 and is provided at the top with a conical entrance opening 67 to receive the latch member 61 carried by the lid. The latch member is notched, and a keeper 69 is pivoted in the housing 65 to engage the member 61 when the lid is in closed position. The keeper is spring-pressed to latching position, and has a release lever 69' which overlies a shoulder 71 on the release link 63. As the latch member 61 on the lid centers the lock, the spring urges the keeper to latching position, shown in Fig. 15. When the release link 63 is raised by actuation of the release solenoid 66, the keeper pivots outward to a release position, and the lid is then raised to its slightly inclined position by the biasing action of the spring 172 on the lid pivot shaft 162.

The electrical diagram of Fig. 16 indicates the cycle of the disposal operation. As shown, the incineration step of the cycle is timed by a timing mechanism, which may be of any suitable known type. Fig. 16 shows functionally and diagrammatically a known timer which has been used. This includes a timer motor 190 connected to a timer shaft 192 through a normally open magnetic clutch 194. The timer shaft 192 carries a timer cam 196, which is spring pressed to its starting position by a spiral spring 198. The timer cam actuates a normally-open single throw power switch 200 and a double-throw control switch having a blade 202 which is normally closed against a contact 204 and which moves away from that contact 204 into closing engagement with a second contact 206.

The electrical system shown in Fig. 16 is adapted to be supplied from a 28-volt direct-current supply such as that commonly used on airplanes, and the connections are of the single wire type, with one side of the line grounded. The main supply line 210 is connected through a fuse or other circuit breaker 212 to the main switch 50 controlled by the actuator lever 42. The main switch circuit leads to the coil of a relay 214 adapted to close a normally open switch 216. The main switch is also connected to energize the pilot light 68. The supply line 218 from the relay switch 216 is connected directly to the motor 104 of the blower 32, and is connected directly to the winding of the magnetic clutch 194. The main line 218 is also connected to the normally-open power switch 200 and to the blade 202 of the double-throw control switch. The contact 204 which is normally engaged by the switch member 202 is connected by a line 220 to the timer motor 190. The normally-open contact 206 is connected by a line 222 to the thermal switch 144, and through that switch to the lock release solenoid 66. The thermal switch 144 is normally closed, but opens with a temperature rise and re-closes when the temperature drops to a predetermined point. The opposite side of the normally open switch 200 is connected in parallel to the agitator drive motor 74, the fuel pump motor 53, the solenoid of the normally-closed fuel valve 54, and the ignition unit 58.

Operation of the incinerator toilet is as follows:

When the apparatus is in normal condition available for use, the toilet lid 24 is in its unlocked closed (slightly raised) position shown in dotted lines in Fig. 9, and the receptacle cover 28 and the exhaust valve 38 are both closed. Lifting movement of the lid 24 to its full open position shown in chain lines in Fig. 9 retracts the receptacle cover 28 to its open position shown in dotted lines in Fig. 1, and the toilet is ready for use. When the toilet has been used, the lid 24 is closed to its fully locked position shown in Figs. 1 and 2. Its closing movement first drives the receptacle closure 28 to its closed position, and then depresses the seat 22 to cause the plungers 158 carried by the seat to press the cover 28 against the seat rim 84 of the receptacle. This closes and seals the receptacle opening.

During the final closing movement of the lid 24, its pivot shaft 162 drives the actuating lever 42 counter-clockwise in Fig. 2 to its actuated position shown in that figure, and the connected link 44 and lever 46 retract the exhaust valve 96 to its open position. At the end of its movement, the actuator lever 42 depresses the plunger 48 to close the main switch 50. As these actions are completed during the final movements of the lid 24 to its fully closed position, the latch carried by the lid 24 is engaged by the lock 62, and the lid is locked in closed position.

Upon the closure of the main switch 50, the pilot light 68 is lighted and the relay 214 is actuated. This immediately energizes the blower motor and starts the blower 32, and it immediately energizes the magnetic clutch 194 of the timer to engage that clutch. It also supplies a circuit through the switch member 202 and the normally closed contact 204 to the timer motor 190, to energize that motor. The timer cam 196 now moves clockwise (Fig. 16), and its cam rise 197 closes the normally open switch 200 to start the agitator 74, the fuel pump 53, and the ignition unit 58, and to open the fuel valve 54. Fuel is then supplied to the already moving stream of air in the fuel mixing tube 106, and the fuel mixture is ignited. A high velocity blast or stream of high-temperature flame—having a flame temperature of the order of 1900° F. with gasoline as the fuel—is discharged inward and downward into the incineration chamber into direct-firing relationship with the wastes contained therein, that is, with the flame playing directly onto the wastes. The agitator is in operation, to break up the solids in the wastes and to stir the waste mixture. The path of movement of the rollers carries them through the flame blast. The agitator rods 138 move in a circular epicyclic course, and are alternately pushed down into the sewage and lifted therefrom into the flame, to expose adhering films and particles of sewage to the hot and forceful flame. Wastes are thus mixed and dried, and their liquids are rapidly vaporized and sterilized and discharged through the stack 36 to the atmosphere. (The discharge collar 100 of the stack is connected to a suitable outlet pipe when the device is installed in a moving vehicle, or to a chimney when the device is in a stationary installation.) As the liquids are driven off and the solids are broken up and dried, the solids become combustible, and are burned. The action of the agitator prevents the formation of encrusted masses on which a charred crust prevents drying and burning of the center portions, and the solids are thus completely burned to a fly ash residue. The products of combustion and the fly ash are discharged through the stack, and the entire chamber is scoured by the flame.

During the incineration operation, air is drawn into the collar by the relatively high capacity blower 32, and its flow rate is substantially reduced by the back pressure of the burner. It nevertheless cools the outer walls of the receptacle assembly and permits a high incineration temperature without excessive temperatures of the outer walls, and an adequate supply of air is provided for combustion both of the fuel and of the wastes. The air is preheated and the heat it carries aids in the incineration process.

As the temperature rises during the incineration step, the thermal switch 144 is actuated from its normally closed position to an open position. Subsequently, at the end of the predetermined time controlled by the timing mechanism, the cam 196 reaches its end position shown in dotted lines in Fig. 16, where the cam fall 199 has allowed the power switch 200 to open and the cam rise 197 has raised the control switch member 202 to move it away from its normally closed contact 204 and into engagement with its contact 206. The opening of the power switch 200 stops the agitator and the fuel supply and the ignition, and the flame goes out. The disengagement of the contact 204 of the control switch breaks the circuit to the timer motor 190, which stops and remains in its advanced position; and since the magnetic clutch 194 remains engaged, the timing cam 196 is held in its advanced position. The engagement of the switch member 202 with the normally-open switch contact 206 establishes a circuit through the wire 222 to the now open thermal switch 144, and such circuit is maintained so long as the cam 196 is held in its advanced position.

While the combustion and agitation have now been stopped, the blower continues, to move air through the shell of the receptacle assembly and cool that assembly. Since the fire is now out and its back-pressure is absent, the cooling air flow is greatly increased. The receptacle assembly is thus rapidly cooled to a predetermined useable temperature suitable to the comfort of the user and below the boiling point of liquids which may be deposited in it. As the temperature of the shell drops to the predetermined point, the thermal switch 144 closes, to complete the circuit from that switch to the lock release solenoid 66. The resulting operation of that solenoid actuates the lock release linkage 63–64 to release the lock 62 and permit the toilet seat 24 to rise to its partially open normal position shown in dotted lines in Fig. 9, under the influence of the spring 172 shown in Figs. 11 to 13. Upon such movement of the lid, the actuating lever 42 is released from its actuated position and is retracted by its retraction spring 41. This closes the exhaust valve 96 and releases the switch plunger 48 to open the main switch 50. The opening of that switch 50 de-energizes the relay 214, and its switch 216 opens to de-energize the blower motor 104 and the magnetic clutch 194. When the clutch 194 opens, it frees the timer shaft 192 for retraction to its starting position by the return spring 198. The toilet apparatus is now in ready position, available for a subsequent use. In a test model of the incinerator, the incineration step was continued by the timer for about four minutes, and cooling took about six minutes, so that the complete disposal cycle required about ten minutes.

We claim as our invention:

1. An incinerator toilet, comprising a receptacle, means to discharge a flaming mixture of fuel and air in said receptacle, an agitator drive member extending into the receptacle, a bearing for said member, a blower to supply forced air to said discharge means, and means connecting said blower to discharge air through said bearing to oppose leakage therethrough.

2. An incinerator toilet, comprising an incinerator receptacle having an inlet opening and a stack outlet, a cover for the opening, means to close the outlet, and interconnecting means to open and close the outlet closure in response to closing and opening movements respectively of said cover.

3. An incinerator toilet as defined in claim 2 with the addition of incineration means operable in a cycle, means to lock said cover in closed position, and means to initiate an incineration cycle in timed relation to engagement of said lock means.

4. In an incinerator toilet, having a toilet seat, an incinerator receptacle beneath said seat and a cover for said receptacle, the improvement which comprises a burner to discharge flame in direct-fired relationship to wastes received in said receptacle and having a normally closed fuel supply and deenergized ignition means, an agitator in said receptacle, means to move air in cooling relation with said receptacle and to supply combustion air to said burner, control means operative in timed relation to the closing of said cover to open said fuel supply, energize said ignition means and initiate operation of said agitator and air-moving means, releasable means for latching said cover closed subsequently operable means to cut off said fuel supply, deenergize said ignition means and stop said agitator, and temperature responsive means to inactivate the air moving means and to release said latching means when the receptacle temperature drops to a predetermined point.

5. In an incinerator toilet having a toilet seat, an incinerator receptacle beneath said seat and a cover for said receptacle, the improvement which comprises a burner to discharge flame in direct-fired relationship to wastes received in said receptacle and having a normally closed fuel supply and deenergized ignition means, an agitator in said receptacle, means to move air in cooling relation with said receptacle and to supply combustion air to said burner, control means operative in timed relation to the closing of said cover to open said fuel supply, energize said ignition means and initiate operation of said agitator and air-moving means, subsequently operable means to cut off said fuel supply, deenergize said ignition means and stop said agitator, and temperature responsive means to inactivate the air moving means when the receptacle temperature drops to a predetermined point, said subsequently operable means including an element having an initial position and a final position, means connected to drive said element from initial to final position in proportion to the elapse of time and means responsive to the subsequent operation of said control means in timed relation to the opening of the cover for restoring said element to its initial position.

6. The structure defined by claim 5 in which said driving means comprises an electric motor connected to said element by a normally disengaged electric clutch, said control means includes a normally open switch which is closed by closing said cover and said subsequently operable means includes switch means closable by said element for connecting said normally open switch with said motor and clutch when the normally open switch is closed, to hold said motor energized and said clutch engaged.

7. An incinerator toilet comprising an incineration receptacle having an opening, a cover for said opening, releasable means to lock said cover in closed position, a direct firing fuel burner for said receptacle, control means to initiate combustion in said burner in timed relation to the engagement of said lock means, lock releasing means, a normally open thermostatic switch adapted to be closed in response to a predetermined low temperature in said receptacle to actuate said lock releasing means, means including a normally open switch connected, when closed, to supply current to said thermostatic switch and a device operable in response to the control means and after a predetermined, elapsed time after the engagement of said lock means for closing said normally open switch, whereby said thermostatic switch will be conditioned to actuate said lock releasing means when the predetermined low temperature is attained.

8. The structure defined by claim 7 wherein said device includes means for terminating combustion in said burner after said elapsed time.

9. The structure defined by claim 7 wherein blower is connected to supply air to said burner and is energized for operation in response to said control means and wherein said control means is rendered ineffective to energize said blower in response to the actuation of said lock releasing means.

References Cited in the file of this patent

UNITED STATES PATENTS

| 25,311 | Adamson | Sept. 6, 1859 |
| 592,107 | Curtis | Oct. 19, 1897 |
| 749,769 | Wilson | Jan. 19, 1904 |
| 904,501 | Conley | Dec. 1, 1908 |
| 1,131,188 | Weaver | Mar. 9, 1915 |
| 1,155,492 | Krenz | Oct. 5, 1915 |
| 1,476,490 | Christensen | Dec. 4, 1923 |
| 2,044,085 | Laghetto | June 16, 1936 |
| 2,282,370 | McConechy | May 12, 1942 |
| 2,376,938 | Potter | May 29, 1945 |
| 2,514,657 | Martin | July 11, 1950 |
| 2,527,188 | Huber | Oct. 24, 1950 |
| 2,678,450 | Simpson | May 18, 1954 |
| 2,693,774 | Knowles | Nov. 9, 1954 |
| 2,700,775 | Martin | Feb. 1, 1955 |
| 2,768,386 | Graef et al. | Oct. 30, 1956 |

FOREIGN PATENTS

| 876,530 | France | Aug. 3, 1942 |